(12) United States Patent
Burmester et al.

(10) Patent No.: US 9,964,127 B2
(45) Date of Patent: May 8, 2018

(54) ACTUATING DEVICE FOR A ROTATABLE CLOSURE PART OF A VALVE

(75) Inventors: Jens Burmester, Grambek (DE); Matthias Südel, Ratekau (DE)

(73) Assignee: GEA TUCHENHAGEN GMBH, Buchen (DE)

( * ) Notice: Subject to any disclaimer, the term of this patent is extended or adjusted under 35 U.S.C. 154(b) by 958 days.

(21) Appl. No.: 14/352,882

(22) PCT Filed: Aug. 21, 2012

(86) PCT No.: PCT/EP2012/003541
§ 371 (c)(1),
(2), (4) Date: Sep. 8, 2014

(87) PCT Pub. No.: WO2013/056761
PCT Pub. Date: Apr. 25, 2013

(65) Prior Publication Data
US 2015/0143989 A1 May 28, 2015

(30) Foreign Application Priority Data

Oct. 20, 2011 (DE) .................. 10 2011 116 627

(51) Int. Cl.
*F16K 31/16* (2006.01)
*F15B 15/06* (2006.01)
(Continued)

(52) U.S. Cl.
CPC ........ *F15B 15/068* (2013.01); *F16K 31/1221* (2013.01); *F16K 31/16* (2013.01); *F16K 31/5282* (2013.01)

(58) Field of Classification Search
CPC .. F15B 15/068; F15B 11/003; F16K 31/5282; F16K 31/16; F16K 31/1221
See application file for complete search history.

(56) References Cited

U.S. PATENT DOCUMENTS 2,918,903 A * 12/1959 Geyer ................ F15B 15/1485
277/526
6,427,992 B1 * 8/2002 Noda ..................... B25B 5/062
269/24
(Continued)

FOREIGN PATENT DOCUMENTS

DE     17 50 372 A1    2/1972
DE     28 17 260 A1   10/1979
(Continued)

*Primary Examiner* — F. Daniel Lopez
*Assistant Examiner* — Abiy Teka
(74) *Attorney, Agent, or Firm* — Vidas Arrett & Steinkraus (57) ABSTRACT

The invention relates to an actuating device for a rotatable closure part of a valve, in particular a pneumatically or hydraulically actuatable rotary drive for a disk or throttle valve, with a housing, in which a drive piston that is sealed from a cylindrical housing casing is arranged and is suppliable on one side with a pressurizing medium, which preferably has a tubular piston skirt, with a drive shaft, which is guided on one side out of the housing and drives in a rotating manner the closure part indirectly or directly, wherein the drive piston executes either an axial shift movement against the effect of at least one return spring in the case of a one-sided supply with the pressurizing medium or a back and forth shift movement in the case of an alternating supply with a pressurizing medium, wherein the piston skirt experiences an axially oriented guidance in the housing via at least one axial groove formed in it, into which a straight-line guide cam permanently connected with the housing engages, and wherein the piston skirt has at least one helical groove arranged in it, into which a drive bolt permanently arranged on or in the drive shaft is arranged, so that the radially and axially mounted drive shaft experiences a rotation around the axis of rotation due to the axial shift movement of the drive piston oriented in the direction of its axis of rotation.

21 Claims, 5 Drawing Sheets

(51) Int. Cl.
*F16K 31/122* (2006.01)
*F16K 31/528* (2006.01)

(56) References Cited

U.S. PATENT DOCUMENTS 6,666,129 B1 * 12/2003 Schmid ................ F15B 15/068
                                                              92/13.6
7,290,480 B2 * 11/2007 Rentz ..................... B23Q 3/069
                                                              269/27

FOREIGN PATENT DOCUMENTS

| DE | 3315244 A1 | 10/1984 |
| --- | --- | --- |
| DE | 3303872 C2 | 4/1992 |
| DE | 43 13 751 A1 | 11/1994 |
| DE | 297 03 710 U1 | 8/1997 |
| DE | 20 2005 014 348 U1 | 11/2005 |
| DE | 60 2004 001 988 T2 | 9/2007 |
| DE | 10 2010 002 621 A1 | 9/2011 |
| DE | 199 50 582 C1 | 9/2011 |
| EP | 0599770 A2 | 6/1994 |
| EP | 0 622 574 A2 | 11/1994 |
| FR | 2236103 A1 | 1/1975 |

* cited by examiner

ACTUATING DEVICE FOR A ROTATABLE CLOSURE PART OF A VALVE

CROSS-REFERENCE TO RELATED APPLICATIONS

This application is a U.S. National Stage application which claims priority to PCT/EP2012/003541, filed on Aug. 21, 2012, which claims priority to DE 10 2011 116 627.4, filed Oct. 20, 2011. The claims have been amended to conform to U.S. practice and to eliminate multiple dependent claims.

BACKGROUND OF THE INVENTION

An actuating device of the generic type (also referred to as a rotary drive), in which a drive piston executes an axial shift movement against the effect of at least one return spring in the case of a one-sided supply with a pressurizing medium, is described in EP 0 599 770 A2. In a tubular piston skirt releasably connected with the drive piston, two diametrically arranged axial grooves are arranged for the straight-line guide of the drive piston and a single cam guide groove tilted against the axial movement direction of the drive piston is arranged in order to generate the rotary movement of the drive shaft. The drive shaft is fed into the environment on one side through the floor of a housing of the actuating device, and a tubular bearing body is permanently arranged on this floor, which protrudes into the housing and serves to mount and guide the piston skirt on the end side. In the end-side area of the bearing casing facing away from the floor, a cross bolt is anchored in it, which radially penetrates the bearing casing from the one side to the other side and thereby reaches through the two axial grooves of the piston skirt. The drive shaft is radially mounted in the floor penetrated by it on one side and, in the direction towards its surrounding-area-side shaft end, axially mounted and, on the other side, it has its radial mounting on the inside of the tubular piston skirt, which is axially shiftable on the drive shaft. An axial mounting in the direction of the piston skirt has the drive shaft on the cross bolt. A radially oriented pin, which engages in the cam guide groove in the piston skirt, is permanently anchored in the drive shaft.

While the movement kinematics of the known actuating device is achieved with relatively simple means, it only works at the price of a hardly stable and imprecise drive-piston-side radial mounting of the drive shaft. This radial mounting takes place indirectly in the bearing casing, and namely via the tubular piston skirt, wherein the piston skirt itself is releasably connected with the drive piston and is joined with sufficient play respectively due to its axial back and forth movement radially outside with respect to the bearing casing and radially inside with respect to the drive shaft. Moreover, the rotation angle limitation of the drive shaft takes place in a stroke-dependent manner and thus imprecisely since the stroke movement of the drive piston or of the piston skirt connected with it is limited by unrevealed impacts and not the rotary movement.

FR 2 236 103 A1 describes a rotary drive with kinematics, which generally match those of EP 0 599 770 A2. However, the resetting of the drive piston does not take place through a return spring but rather it is supplied with pressurizing medium on both sides and the drive shaft is fed out of the housing of the rotary drive on both front sides of the housing.

An actuating device for a rotatable closure piece of a valve is described in DE 33 03 872 C2 or in its additional application (DE 33 15 244 A1). A single cam guide is provided in the piston of the former actuating device and two cam guides arranged opposite each other are provided in the piston of the latter device, which are worked into the outer piston casing in the form of diagonal grooves and engage in the drive rollers, which are rotatable around axes. The axes of the rollers are fastened on the housing casing of the actuating device. The piston thus executes a stroke and simultaneously a rotary movement in the case of a pressurizing medium supply. This rotary movement is transferred to a drive shaft connected with a valve shaft via a square coupling designed in the center of the piston. The drive shaft is overhung radially and axially to both sides in the lower cylinder cover of a tubular pneumatic cylinder and it thereby engages in a torque-proof, carrying manner in the piston axially shiftable on it. The rotation angle limitation of the drive shaft takes place in an axial idle position assumed by the piston under the effect of a return spring on an axially adjustable adjustment element. This thus involves a stroke-dependent and thus indirect rotation angle limitation.

DE 60 2004 001 988 T2 discloses an actuator for actuating a valve, which is provided with a rotatable valve element. A piston is exclusively axially shiftable against the reset force of a spring in a housing, since it is fed over respectively pairwise, diametrically arranged, housing-tight guide rods, which engage in the piston respectively axially and in the circumferential direction displaced against each other from both sides. Two cam guides arranged opposite each other in the form of helical, end-side respectively closed grooves are worked into the piston casing, into which drive rollers engage, which are rotatable around an axis permanently arranged in an actuating rod perpendicular to the longitudinal axis of the piston. The rotationally relocatable actuating rod is shiftably mounted in an axial and rotationally relocatable manner on one side in a cylindrical, centrical hole in the piston casing and it penetrates on the other side a floor of the housing and has there its axial fixed bearing. In the case of an axial shift of the piston, the actuating rod fixed axially in the housing floor thus executes an assigned rotary movement. The rotary movements are limited through placement of the drive rollers on the respectively assigned end of the groove.

DE 10 2010 002 621 A1 describes an actuator for a rotatable functional element, in particular a closure element of a disk valve or ball valve, which possesses the kinematic mode of operation of the actuator according to DE 60 2004 001 988 T2. In contrast to the latter, it possesses only two guide rods, wherein one is anchored in the one cover of a housing and the other in the other cover and the two guide rods in the piston end blindly in opposing directions. The rotation angle limitation of the drive shaft takes place through axial end position limitation of the piston on the covers. This thus involves a stroke-dependent and thus indirect rotation angle limitation.

An actuating device for a rotatable closure part of a valve, which possesses the kinematic mode of operation of the actuator according to DE 60 2004 001 988 T2 or DE 10 2010 002 621 A1, is described in DE 199 50 582 C1. In contrast to these two actuators, the actuating device has two housing-tight guide rods, which are arranged diametrically to each other in a cover of the housing and end blindly in the same direction in a shaft of the piston receiving the two helical grooves. The rotation angle limitation of the drive shaft takes place through axial end position limitation of the piston on the covers. This thus involves a stroke-dependent and thus indirect rotation angle limitation.

DE 28 17 260 A1 describes a setting device for fluid valves, for example a ball valve, in which an inner, hollow cylinder is mounted in a rotationally relocatable manner in a cylindrical outer housing, which has diametrically arranged, axially oriented slits. The inner cylinder possesses in its casing surface two diametrically arranged, helical grooves. A stroke cylinder arranged on the outer housing possesses a piston rod, which is led into the inner cylinder and engages there both in the grooves as well as in the slits with a cross pin permanently connected with the piston rod, on which sliding casings are arranged on both sides. The outer housing is permanently connected with a housing of the ball valve and the inner cylinder is permanently connected with a rotationally relocatable actuating rod of the ball valve. The piston rod guided in an axially mobile manner in the slits thus effectuates a rotary movement of the inner cylinder and thus of the actuating rod of the ball valve in the clockwise or counterclockwise direction in the case of a straight-line movement generated by the stroke cylinder. The rotation angle limitation of the inner cylinder takes place through axial end position limitation of the sliding casings on the closed ends of the axially oriented slit. This thus involves a stroke-dependent and thus indirect rotation angle limitation.

DE 43 13 751 A1 describes an actuating device for a rotatable closure piece of a valve, in which a casing-shaped appendage of a drive shaft guided out of a cover of the housing and mounted in a rotationally relocatable manner in an axial fixed bearing and said drive shaft protruding into a housing of the actuating device has two diametrically arranged helical grooves. Two diametrically arranged, axially oriented slits are provided in a bearing casing permanently connected with the cover. A piston rod of a shiftable piston arranged in the housing is permanently connected with a diagonal pin, on which two neighboring sliding rollers are arranged on both sides respectively. The respective outer sliding roller engages in the slit and the respective inner sliding roller engages in the groove. The piston rod guided in the slits in an axial mobile manner thus effectuates a rotary movement of the casing-shaped appendage and thus of the drive shaft in the case of a stroke movement generated by the piston. The rotation angle limitation of the drive shaft takes place on one hand through axial end position limitation of the piston on the other cover of the housing and on the other hand through placement of the sliding rollers on the closed ends of the slits. This thus involves a stroke-dependent and thus indirect rotation angle limitation.

DE 17 50 372 A discloses a four-way rotary slide changeover valve, in which a valve element or respectively a rotary slide can be turned between two operating positions. The required rotary movement is generated by means of a straight-line-working actuating device, which has two diametrically arranged cam guides on it circumference. An actuating pin arranged on a drive rod of the rotary slide engages into each of these cam guides. The two working positions of the rotary slide are fixed for example through a locking part fastened on the straight-line-working actuating device, which engages in an associated locking groove in the respective working position. This thus involves a stroke-dependent and thus indirect rotation angle limitation.

A flow-dependent, changeable rise in the cam guide groove of an actuating device of the type discussed here is described in EP 0 622 574 B1. This publication discloses a cam surface of the cam guide groove, which changes over to a more weakly bent and thus steeper cam section in the closed position of the disk valve, in the case of an only axially movable drive piston, which is guided in two housing-side straight-line guide grooves arranged diametrically to each other by means of drive rollers. Due to the weaker bend, an increase in the tangential force and thus an increase in the torque in this axial position of the drive piston and thus during movement of the closure part into the seating seal are achieved.

A stroke-independent, direct rotation angle limitation of the drive shaft is known from DE 20 2005 014 348 U1 and also from DE 297 03 710 U1. In the case of both rotary drives, the drive piston is guided in a torque-proof manner, and namely through two guide rods arranged diametrically to each other and permanently connected with a floor of a housing, which engage in assigned guide holes in the drive piston. DE 20 2005 014 348 U1 discloses a rotary movement device for limiting the rotary movement, which consists of a locking cam anchored in the housing and a stop element permanently connected with the drive shaft and having an approximately circular-segment-like recess, into which the locking cam engages and in which it can move relatively between two end-side stop surfaces on a circular-segment-shaped track. DE 297 03 710 U1 describes a stop segment fastened on the drive shaft in a correspondence with the guide rods fastened on the floor of the housing, which limit the angle of rotation in a stroke-independent manner and directly to its exact target value. The two known rotation angle limitations are relatively complex and the end position limitation of the drive shaft does not take place directly on the stationary housing, but rather indirectly via a locking cam or via two guide rods, wherein an adjustment of the angle of rotation can only take place by reworking the circular-segment-like recess on the stop element or respectively on the stop segment.

The object of the present invention is to create an actuating device of the generic type, which is constructed in a simple manner and at the same time has a high stability in the area of the mount of the drive shaft and in the area of the straight-line and cam guide arranged in the drive piston and also has a stroke-independent, direct rotation angle limitation with the greatest possible accuracy.

BRIEF SUMMARY OF THE INVENTION

This object is solved through an actuating device with the characteristics of the claim 1. Advantageous embodiments of the actuating device are the subjects of the dependent claims.

A first fundamental inventive solution consists in that the drive shaft has a two-sided and thereby respectively direct, radial mounting in a bearing casing permanently connected with the housing or designed in it. This direct radial mounting creates the beneficial prerequisites for a high mounting accuracy.

A second inventive solution is formed in that the piston skirt is mounted in an axially shiftable and radial manner on the outer casing surface of the bearing casing and does not take on guide function for other components, such as the drive shaft. Its guide and mounting on the bearing casing thereby remains unimpaired. If the drive piston, in a first embodiment consisting of a piston floor and the piston skirt, forms a one-piece and preferably positively joined unit, then beneficial prerequisites for a high guidance and mounting accuracy are established. If the drive piston, in a second embodiment, and here in an at least two-part or respectively two-piece design, consists of an inner piston and an outer piston and if the inner piston with its piston floor and its piston skirt forms a one-piece and preferably positively joined unit, then adequate guidance and mounting qualities are established for the first embodiment.

A third fundamental invention solution consists in that the at least one drive bolt experiences a stroke-independent, direct limitation of its rotary movement around the axis of rotation due to stop means provided in the bearing casing. Since the drive bolt generates the rotary movement directly on the drive shaft, the direct limitation of its rotary movement according to the invention creates the most beneficial prerequisites for an exact compliance with the desired target value of the angle of rotation.

The variety of parts of the actuating device in the case of its use for valves with different nominal widths and thus different drive torques is reduced when the drive piston is designed as at least two pieces or two parts and it is divided into at least one casing surface of an outer piston and an inner piston concentrically surrounding the axis of rotation of the actuating device. The outer and the inner pistons, respectively seen separately, thereby form a one-piece or respectively one-part unit. The adjustment for the different drive torques takes place in this case via outer pistons designed with differently sized outer diameters, while the inner piston has one and the same size geometry for all drive torques.

One suggestion thereby provides that the at least one outer piston and the at least one inner piston are interconnected in a positive and releasable manner. The suggested separation of the drive piston makes it possible to design the inner piston in a bushing-like manner with a second piston floor and a casing-like second piston skirt connecting to it, while the outer piston has a piston ring and a piston casing connecting to it, wherein the piston casing surrounds the piston skirt preferably completely. The adjustment for the different drive torques can thus take place simply via the piston ring and the piston casing simultaneously stabilizes the piston ring in its position on the piston skirt and thus on the inner piston.

The separation and design of the drive piston into an outer and an inner piston suggested above enables for one a particularly stable form fit between them both, which is characterized in that the outer piston forms a pull connection with a return designed on the second piston floor due to a projection extending radially inward in the area of the second piston floor. Secondly, the at least one helical groove and the at least one axial groove in the second piston skirt, and namely through the entire wall of the same, can be formed in a very simple manner. In the case of the joined drive piston, the piston casing of the outer piston forms a protective casing for the second piston skirt with its at least one axial and at least one helical groove.

If the outer piston is designed among other things in the form of the piston rod described above, outer pistons with piston rings designed with differently sized outer diameters can be joined with inner pistons that always have one and the same size geometry, whereby the adjustment for different drive torques is very simple and the variety of parts of the actuating device is reduced.

One suggestion provides that the at least one straight-line guide cam is fastened in or on the bearing casing. The drive piston thereby experiences its rotation-preventing straight-line guide on the component, namely the bearing casing, which also generally guides it axially. If, as provided by another suggestion, two straight-line guide cams arranged diametrically to each other are provided, each of which engages in a associated axial groove, this results in a more beneficial power distribution within the pairing of the piston skirt, straight-line guide cam and bearing casing and an improved, tilt-free guide of the drive piston on the bearing casing than is the case with only one straight-line guide cam.

A more beneficial power distribution within the pairing of the piston skirt, drive bolt and drive shaft and thus in turn an improved tilt-free guide of the drive piston on the bearing casing is ensured according to another suggestion in that two helical grooves arranged diametrically to each other are provided in the piston skirt, into which respectively one assigned drive bolt engages. With this embodiment in mind, if the drive bolts are combined into one single, continuous drive bolt, which engages in one of the helical grooves with its respective end, then the arrangement is simplified while simultaneously increasing its stability.

Another embodiment, which contains an independent inventive idea, provides that the at least one straight-line guide cam and the at least one drive bolt with its respective longitudinal axis are arranged in a single arrangement plane oriented perpendicular to the axis of rotation. So that the piston skirt can be designed axially in the shortest manner possible, it is also suggested that the arrangement plane runs through an end-side area of the bearing casing facing the drive piston.

In particular in the case of two straight-line guide cams and two drive bolts or a single, continuous drive bolt combined from the two drive bolts, the beneficial power distributions resulting from this embodiment are obvious on the drive piston. Since an axial groove serving as straight-line guide and a helical groove are arranged alternately and two times on the perimeter of the piston skirt, wedge-shaped circumferential sections, the tapering of which is respectively oppositely oriented, result between neighboring grooves, seen in the axial extension direction of the piston skirt. If the piston skirt is now pushed over the bearing casing in the course of its stroke, and namely with the two tapered ends of the two circumferential sections first, and thus pressed respectively between a straight-line guide cam and a drive bolt, whereby spreading action forces act on it, the respective circumferential section in the arrangement plane of the straight-line guide cam and the drive bolt then experience reaction forces, which act opposite to the action forces and are compensated for in the circumferential direction. If the stroke direction of the piston skirt is reversed, then the two other circumferential sections, and namely also with the two tapered ends first, are pressed respectively between a straight-line guide cam and a drive bolt so that from now on the respective circumferential section experiences reaction forces in the same manner as described above, which also act oppositely and are compensated for in the circumferential direction.

The forces compensation through arrangement of the at least one straight-line guide cam and the at least one drive bolt in the arrangement plane described above has a particularly advantageous effect when the respective axial groove and/or the respective helical groove, into which the straight-line guide cam or respectively the drive bolt engages, is designed open towards the free end of the piston skirt. The production of the cam guide is thereby designed in a very simple manner. This also applies in a special manner when the cam guide is designed in the form of two helical grooves respectively open towards the free end of the piston skirt, which are arranged diametrically opposed to each other. The open design of the grooves significantly facilitates for one the installation of the drive piston on the bearing casing since the open grooves can easily be pushed on the straight-line guide cam and the drive bolt and secondly the stability and rigidity of the open arrangement is not impaired by this design since no free reaction forces exist, which could put stress on the circumferential sections of the piston skirt in question in the circumferential direction, which can be considered respectively projecting bars clamped on one side.

In order to determine the desired target value of the angle of rotation, preferably one of 90 degrees, with very high accuracy, it is suggested that the stop means assigned to the at least one drive bolt is designed in the form of a circumferential groove provided in the bearing casing and extending in a limited manner in its circumferential direction, on the respective end-side boundary of which the drive bolt comes to rest. In the case of two drive bolts or one single continuous drive bolt, two circumferential grooves to this effect arranged diametrically to each other are provided. In both cases, the respective circumferential groove should be measured in the circumferential direction, i.e. on its respective lateral boundary, in a preferred embodiment such that the circumferential groove in consideration of and in cooperation with the relevant dimensions of the assigned drive bolt between the limited rotary movement end positions of the drive bolts permits an angle of rotation that corresponds exactly with a predetermined target value. This target value is determined through the rotary movement of the closure part between its close and open point.

The torque for the actuation of the disk-like closure part of the valve can be adjusted in an easy manner based on need, in particular in the phase of the movement into the seating seal, if the at least one helical groove has a path-dependent changeable rise. In this regard, it is advantageous to design the rise, measured against the longitudinal axis of the drive piston oriented in the direction of the axis of rotation, in the respective end area of the helical groove greater than in its middle area. A greater torque is thereby realized in the end areas than in the middle area. In this regard, both end areas are optionally operable since the actuating device, with respect to the closure part, can be arranged on the valve in both a spring-closing and spring-opening manner. This type of switch characteristic is achieved through an arrangement of the actuating device with respect to the valve that differs by 90 degrees.

With respect to the housing design, it is provided that the housing casing is connected releasably or positively with a first front side of the housing penetrated by the drive shaft. In the first case, the inside of the actuating device remains accessible for maintenance purposes. In the second case, the actuating device can be produced very cost-effectively, wherein this type of maintenance is no longer possible.

The production costs of the actuating device can be further reduced when the housing casing with a second front surface of the housing lying opposite the first front side of the housing forms a cup-shaped, one-piece unit.

The design of the actuating device according to the invention ensures a very stable and two-sided radial mounting of the drive shaft in the housing-tight bearing casing. In order to also use this mounting for the axial mounting of the drive shaft, it is provided that a first bearing and a second bearing are provided for the radial and axial mounting of the drive shaft in the bearing casing at distance from each other, wherein the second bearing neighboring the drive piston receives an axial force oriented towards it and the first bearing an opposite axial force, respectively exerted by the drive shaft and here respectively preferably by a shoulder of the same.

Valves with a very small nominal width generally require an actuating device, which only needs to generate a correspondingly small drive torque. This drive torque in turn requires a drive piston with a relatively small outer diameter and preferably designed as one piece with a piston skirt with approximately the same diameter because a reduction of its diameter is hardly possible due to the constructive provisions to be housed in it. In the case of this design, the arrangement of a return spring surrounding the piston skirt on the outside is not possible. In order to solve this arrangement problem of the return spring in an advantageous manner, one suggestion provides that the at least one return spring is arranged on one hand within the first piston skirt and its axial support is on a first piston floor of the first drive piston and that on the other hand the receiver and axial support of the at least one return spring is provided in a front-side recess in the drive shaft. The position stability of the return spring is increased when it, as is suggested, is designed split in two in the longitudinal direction and its neighboring ends are received in an intermediate piece, which is guided in an axially displaceable manner preferably in the front-side recess.

The actuating device according to the invention is preferably used as a pneumatically or hydraulically actuatable rotary drive for a disk or throttle valve.

BRIEF DESCRIPTION OF THE SEVERAL VIEWS OF THE DRAWINGS

A more detailed representation of the invention results from the following description and the attached figures of the drawing as well as from the claims. While the invention is realized in the most various exemplary embodiments, two preferred exemplary embodiments of the actuating device are shown in the drawing and are described below according to structure and function. They show:

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

An actuating device 1 (FIGS. 1 to 6) for a rotatable closure part of a valve is, in relation to the representation position, connected with the latter on the bottom via a lantern housing 23 (FIG. 5) (valve with closure part is not shown). The lantern housing 23 is screwed onto a first housing front side 2.2 of a housing 2 of the actuating device 1 by means of a lantern flange 23a preferably via threaded bolts 24 and nuts 25. The exemplary embodiment concerns a pneumatically actuatable actuating device 1 (pneumatic pressurizing medium D), also called the rotary drive, for the valve, which is also called the disk or throttle valve. The actuating device 1 can also be supplied with a hydraulic pressurizing medium D in the case of a corresponding adjustment.

Figure 5:
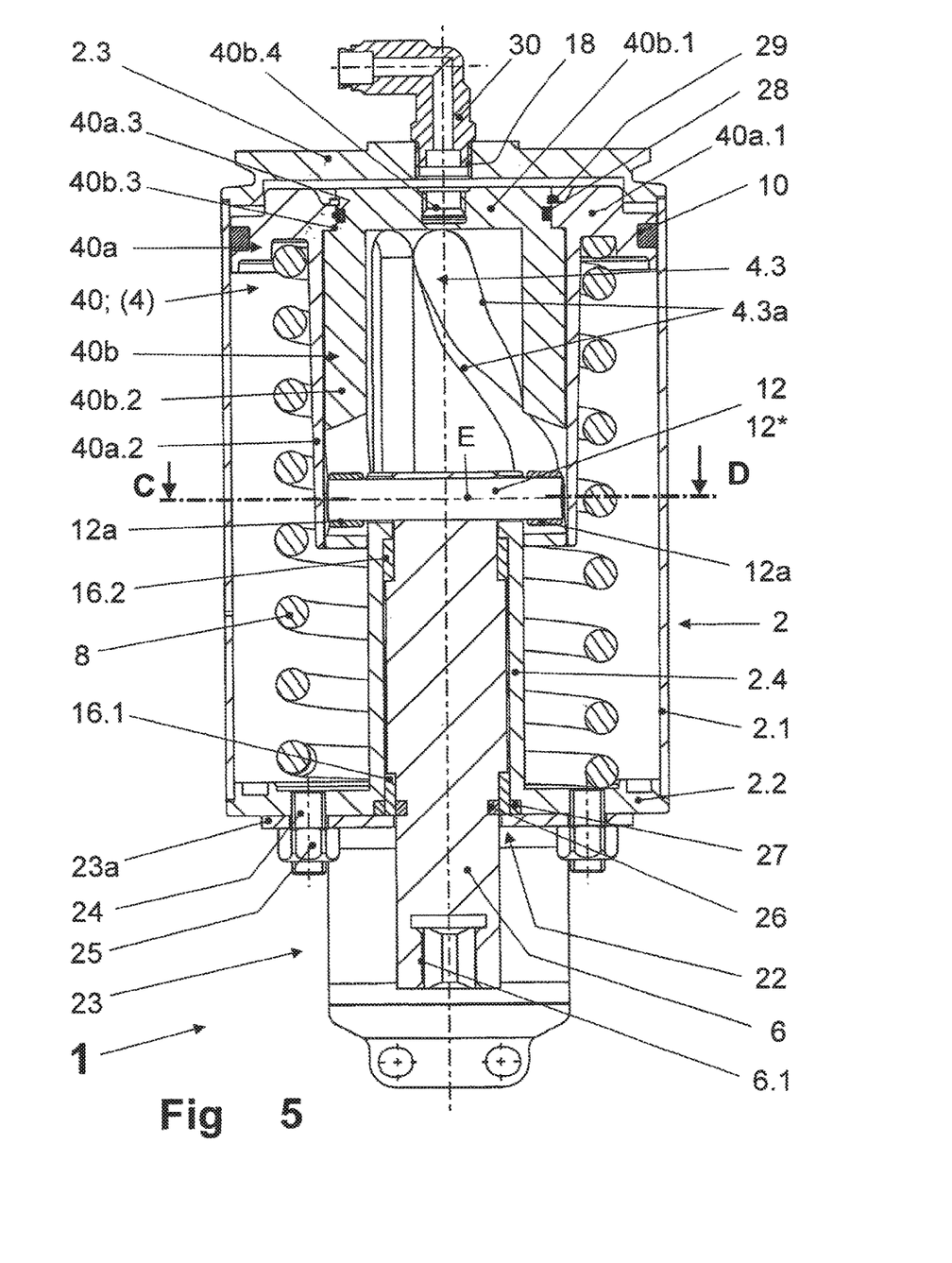
FIG. 5 a preferred second embodiment of an actuating device according to the invention with a two-piece drive piston in a middle cut and FIG. 6 a cross-section through the actuating device according to FIG. 5 according to a cut progression labelled in FIG. 5 with C-D.

The actuating device 1 consists of a housing 2 (FIGS. 1, 2, 5), in which is arranged a first drive piston 4 sealed off from a cylindrical housing casing 2.1 by means of a piston seal 10, suppliable on one side with the pressurizing medium D, preferably compressed air, axially displaceable, designed for example as one part or one piece (FIGS. 1, 2) or a second drive piston 40 designed for example as two parts or two pieces (FIG. 5). When supplied with pressurizing medium D, the drive pistons 4, 40 execute respectively an axial shift movement against the effect of at least one return spring 8. Instead of the at least one return spring 8, the drive piston 4, 40 can also execute a back and forth shift movement through alternating supply with a pressurizing medium D, wherein in this case the drive piston 4, 40 is transferred into its initial or idle position by the pressurizing medium D supplying its back side.

Figure 1:
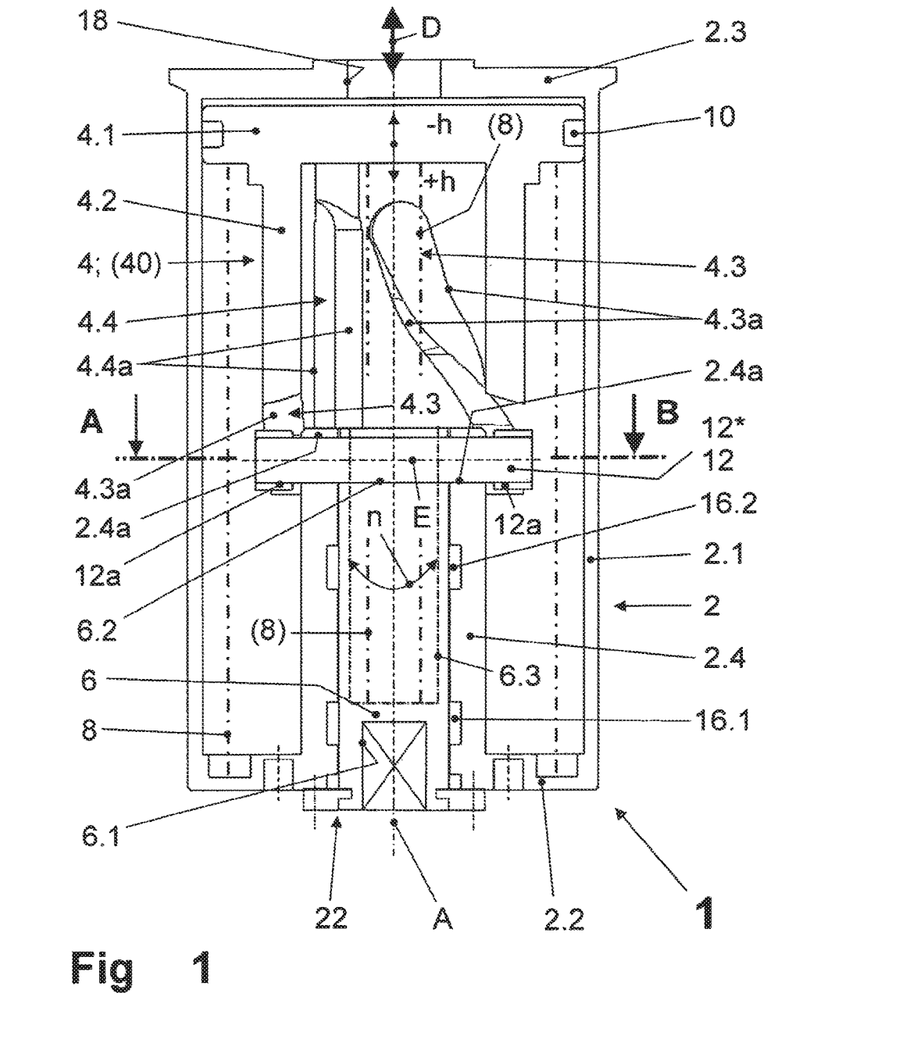
FIG. 1 a preferred first embodiment of an actuating device according to the invention with a one-piece drive piston in a middle cut.
Figure 2:
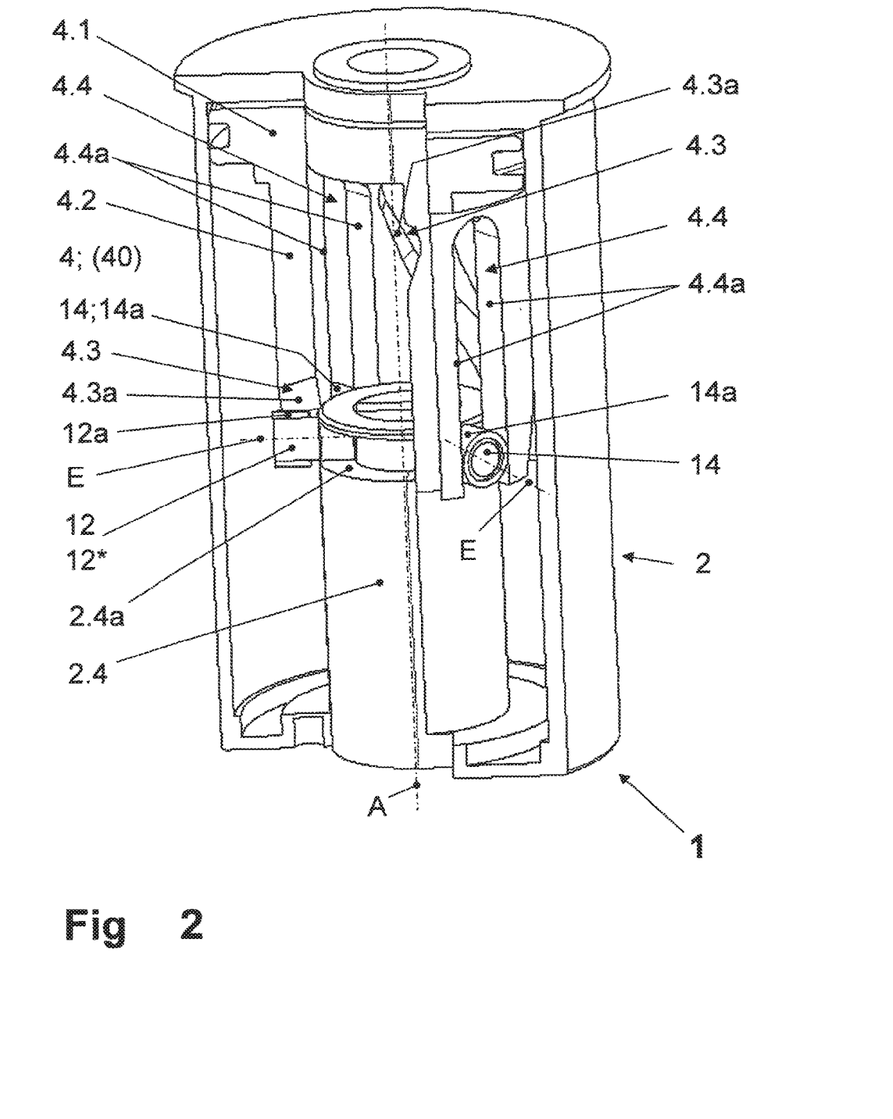
FIG. 2 a view into the cut open actuating device according to FIG. 1 in a perspective representation.

The one-part first drive piston 4 according to FIGS. 1, 2 (preferred first embodiment) has a first piston floor 4.1, on the valve-facing side of which is centrally provided a preferably tubularly designed first piston skirt 4.2. In order to realize a straight-line guide 4.4 of the first drive piston 4, i.e. for its axial guidance within the housing 2, at least one axial groove 4.4*a* is designed in the tubular first piston skirt 4.2. The preferred and shown exemplary embodiment shows two axial grooves 4.4*a* (FIG. 2) arranged diametrically to each other. Moreover, the first piston skirt 4.2 has at least one helical groove 4.3*a*, which forms a cam guide 4.3. In the preferred exemplary embodiment, a helical groove 4.3 is provided in the areas between the two axial grooves 4.4*a* (FIGS. 1, 2).

A drive shaft 6 driving the closure part of the valve indirectly or directly in a rotating manner is guided on one side over the first housing front side 2.2 of the housing 2 out of the latter and is radially mounted on two sides in a bearing casing 2.4 engaging in the housing 2, permanently connected with it and ending in it by means of a first and a second bearing 16.1, 16.2. The drive shaft 6 also experiences an axial mounting acting axially on both sides, which is designed in the exemplary embodiment (FIG. 1) by means of a schematically shown axial bearing 22 arranged for example on the first housing front side 2.2. For torque-proof indirect or direct coupling of the drive shaft 6 with the closure part, a drive recess 6.1 is provided in the front side of the drive shaft 6, which can be designed for example as a square. The tubular first piston skirt 4.2 engages, in relation to the representation position, in its upper stroke end position with its inner casing surface a little bit in the axial direction, around the end-side area of the bearing casing 2.4, whereby it is mounted in an axially displaceable and radial manner on the outer casing surface of the bearing casing 2.4 in the case of suitable measurement of the pairing of the diameter of the inner casing surface and of the outer diameter of the bearing casing 2.4.

Figure 3:
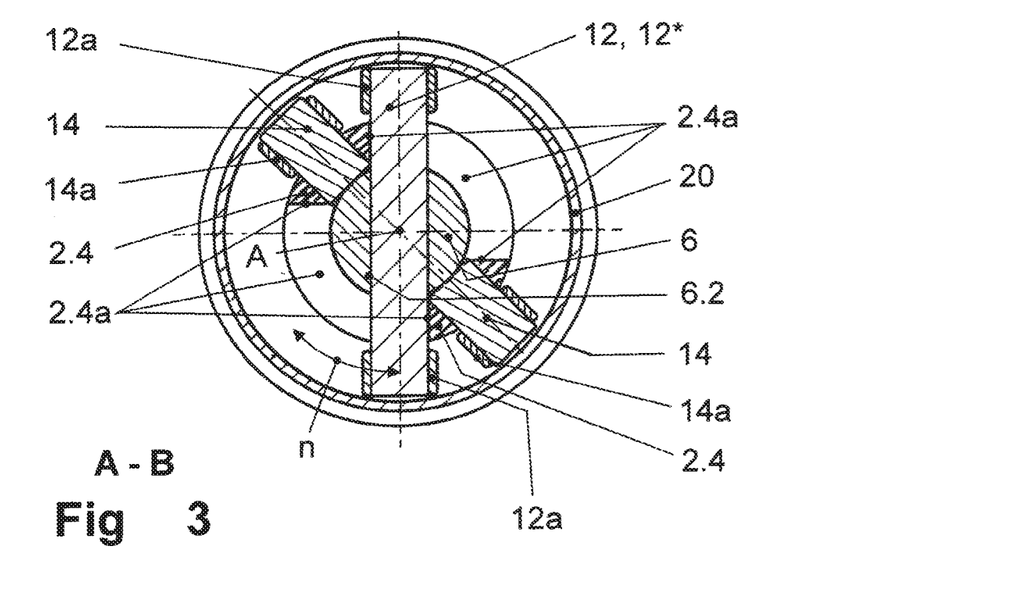
FIG. 3 a cross-section through the actuating device according to FIG. 1 according to a cut progression labelled in FIG. 1 with A-B.

A straight-line guide cam 14 engages in the at least one axial groove 4.4*a*, which is fastened in the radial direction in or on the bearing sleeve 2.4. In the exemplary embodiment, two straight-line guide cams 14 arranged diametrically to each other are provided, which engage in the respectively assigned axial groove 4.4*a* (FIG. 3, FIG. 2). In order to reduce the friction, the straight-line guide cam 14 is advantageously provided on the outside with a straight-line guide roller 14*a*, which is rotatable advantageously around the straight-line guide cam 14, which from now on functions as an axis.

Figure 4:
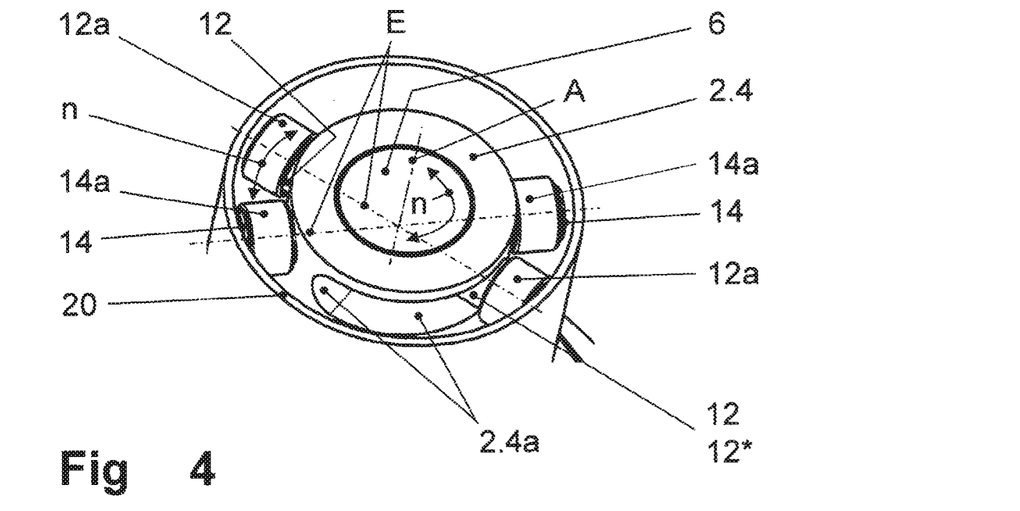
FIG. 4 the stroke-independent rotation angle limitation of the drive shaft of the actuating device according to FIG. 1 in a perspective representation.

A drive bolt 12 engages in the at least one helical groove 4.3*a* (FIG. 1), which is fastened in the radial direction on or in the drive shaft 6 (FIG. 3) and which penetrates the bearing casing 2.4 surrounding the drive shaft 6 on the outside (FIG. 4). Two drive bolts 12 arranged diametrically to each other can advantageously be provided, which engage in the respectively assigned helical groove 4.3*a*. In the exemplary embodiment, the drive bolts 12 are combined into a single continuous drive bolt 12* (FIGS. 1, 2, 3), which penetrates the drive shaft 6 in a radial cross hole 6.2, is fastened there, penetrates the bearing casing 2.4 on both sides in a rotationally relocatable manner and engages in the associated helical groove 4.3*a* with its respective end (FIG. 3, FIGS. 1, 2, 5). In order to reduce the friction, the drive bolt 12, 12* is advantageously provided on the outside with a cam guide roller 12*a*, which is rotatable advantageously around the drive bolt 12, 12*, which from now on functions as an axis.

The at least one straight-line guide cam 14 and the at least one drive bolt 12; 12* are arranged with their respective longitudinal axis preferably in a single arrangement plane E oriented perpendicular towards an axis of rotation A (FIGS. 2, 4, 1, 5), wherein, with a first piston skirt 4.2 built in the axially shortest possible manner in mind, the arrangement plane E runs through an end-side area of the bearing casing 2.4 facing the first drive piston 4. In order to secure the cam guide roller 12*a* and the straight-line guide roller 14*a* in a conceivably simple manner on the assigned drive bolt 12, 12* or respectively the straight-line guide cam 14 from running off and/or to stabilize the first piston skirt 4.2 radially on the outside, a casing tube 20 can for example be pushed over the outer casing surface of the first piston skirt 4.2 (FIGS. 3, 4).

With a simple installation of the first drive piston 4 in mind, it is advantageous to design the at least one axial groove 4.4*a* and/or the at least one helical groove 4.3*a* open towards the free end of the first piston skirt 4.2 (FIGS. 1, 2) since, through this design, the fitting of the first piston skirt 4.2 with its grooves 4.3*a*, 4.4*a* is given via the respective straight-line guide cam 14 and the drive bolt 12, 12*. The at least one helical groove 4.3*a* also preferably receives a progression-dependent changeable rise. The latter is, measured against the longitudinal axis of the first drive piston 4 oriented in the direction of the axis of rotation A of the drive shaft 6, preferably designed in the respective end area of the helical groove 4.3*a* greater than in the middle area (FIGS. 1, 5).

The first drive piston 4 possesses through the straight-line guide 4.4 only one axial shift variance. In the course of this axial shift movement upon supply of the first piston floor 4.1 with the pressurizing medium D, which is fed to a pressurizing medium space formed between the first piston floor 4.1, the housing casing 2.1 and a second housing front side 2.3 closing off the latter on the top via a pressurizing medium opening 18 designed in the second housing front side 2.3, the first drive piston 4 moves downwards (positive stroke orientation +h; FIG. 1) so that the drive shaft 6 experiences, when seen from below, a right-turning rotary movement n around the axis of rotation A, i.e. clockwise, through the drive bolts 12* engaging in the helical grooves 4.3*a* (FIGS. 1 to 5). The first drive piston 4 moves upward out of the first stroke end position under the effect of the at least one return spring 8 (negative stroke orientation −h), so that the orientation of the rotary movement n also reverses.

It is understood that the aforementioned right- or left-aligned rotary movement n depends on whether the helical grooves 4.3a are right or left lay. In the exemplary embodiment, the helical grooves 4.3 are designed right-lay. The at least one return spring 8 shown only as a dashed-and-dotted line in FIG. 1 and thus schematically is supported respectively directly on the top on the first piston floor 4.1 and on the bottom on the first housing front side 2.2. FIG. 2 does not show the representation of the at least one return spring 8 at all; FIG. 5 shows the at least one return spring 8 in the form that is conventional in mechanical engineering.

Due to the effective axial length of the at least one helical groove 4.3a or due to the two-sided limitation of the axial stroke of the first drive piston 4, a maximum angle of rotation results between the two stroke end positions of the first drive piston 4. This type of stroke-dependent limitation of the angle of rotation to a desired target value is generally unsatisfactory and inaccurate since the stroke-dependent limitation is influenced by a series of production tolerances. In order to avoid this general deficiency in the stroke-dependent limitation, it is provided in the case of the actuating device 1 according to the invention that the at least one drive bolt 12 experiences a stroke-independent, direct limitation of its rotary movement n (FIGS. 3, 4, 6) around the axis of rotation A due to stop means 2.4a provided in the bearing casing 2.4.

The above general tenet is preferably designed such that the stop means 2.4a assigned to the at least one drive bolt 12 is designed in the form of a circumferential groove 2.4a provided in the bearing casing 2.4 and extending in a limited manner in its circumferential direction (see FIG. 4 in particular), on the respective end-side boundary of which the drive bolt 12 comes to rest. In the shown preferred exemplary embodiment, the stop means 2.4a assigned to the single drive bolt 12* is designed in the form of two circumferential grooves 2.4a arranged diametrically to each other, provided in the bearing casing 2.4 and extending in a limited manner in its circumferential direction, on the respective end-side boundary of which one respective end of the drive bolt 12* comes to rest (FIGS. 3, 4, 6, 1, 5). The respective circumferential groove 2.4a should thereby be measured in the circumferential direction such that the circumferential groove 2.4a in consideration of and in cooperation with the relevant dimensions of the assigned drive bolt 12; 12* between the limited rotary movement end positions of the drive bolt 12; 12* permits an angle of rotation that corresponds exactly with a predetermined target value. The desired target value of the angle of rotation generally corresponds with the angle of rotation of the closure part between its close and opening position, preferably 90 degrees.

The housing casing 2.1 is joined releasably or positively with the first housing front side 2.2 penetrated by the drive shaft 6. In the exemplary embodiment, a positive connection is shown. The housing casing 2.1 furthermore forms with the second housing front side 2.3 laying opposite the first housing front side 2.2 a cup-like, preferably one-piece unit.

Through assignment of the actuating device 1 to the two possible end positions of the valve, the close and the open position, the downwards movement of the drive piston 4 described above (positive stroke orientation +h) can generate the opening and the closing movement of the valve. The upwards movement of the drive piston 4 (negative stroke orientation −h) is effectuated only through the force of the return spring 8 and correspondingly in the reverse order of the described steps. Depending on the assignment described above, the upwards movement then generates the closing or the opening movement of the valve.

According to a preferably embodiment, which contains an independent inventive idea, the at least one straight-line guide cam 14 and the at least one drive bolt 12, 12* with their respective longitudinal axis are arranged in a single arrangement plane E oriented perpendicular to the axis of rotation A. In particular in the case of two straight-line guide cams 14 and two drive bolts 12 or a single continuous drive bolt 12* combined from the two drive bolts 12, the beneficial power distributions resulting from this embodiment on the drive piston 4, in particular on the first piston skirt 4.2, are obvious. Since the axial groove 4.4a serving as straight-line guide 4.4 and the helical groove 4.3a are arranged alternately and two times on the perimeter of the first piston skirt 4.2, wedge-shaped circumferential sections (partially visible in FIG. 1), the tapering of which is respectively oppositely oriented, result between neighboring grooves 4.3a, 4.4a, seen in the axial extension direction of the first piston skirt 4.2. If the first piston skirt 4.2 is now pushed over the bearing casing 2.4 in the course of its positive stroke orientation +h, and namely with the two tapered ends of the two circumferential sections first, and thus pressed respectively between a straight-line guide cam 14 and a drive bolt 12, 12*, whereby spreading action forces act on it, the respective circumferential section in the arrangement plane E of the straight-line guide cam 14 and the drive bolt 12, 12* then experience reaction forces, which act opposite to the action forces and are compensated for in the circumferential direction. If the stroke direction of the first piston skirt 4.2 is reversed (negative stroke orientation −h), then the two other circumferential sections, and namely also with the two tapered ends first, are pressed respectively between a straight-line guide cam 14 and a drive bolt 12, 12* so that from now on the respective circumferential section experiences reaction forces in the same manner as described above, which also act oppositely and are compensated for in the circumferential direction. Through this force compensation, the first piston skirt 4.2, in which grooves 4.3a, 4.4a designed open preferably towards its free end are provided, whereby it thus must be designed in the circumferential direction less rigid than with self-contained grooves, can remain free of more or less complex cumulative measures. The installation of the drive piston 4 is significantly simplified through the open grooves 4.3a, 4.4a.

In the case of an actuating device 1 for valves with small nominal widths, the at least one return spring 8 surrounding the first piston skirt 4.2 is omitted (FIG. 1) and the at least one return spring (8) is instead arranged on one side within the first piston skirt 4.2 and is axially supported on the first piston floor 4.1 of the first drive piston 4 and is received and axially supported on the other side in a front-side recess 6.3 in the drive shaft 6 (dashed-and-dotted representation of the return spring (8) in FIG. 1). This type of design is only possible if the formation of a continuous drive bolt 12* is foregone and two separated drive bolts 12 are provided. In this case, the return spring (8) is appropriately designed divided in two in the longitudinal direction and its neighboring ends are received in an intermediate piece (not shown), which is preferably guided in an axially displaceable manner in the front-side recess 6.3.

Figure 6:
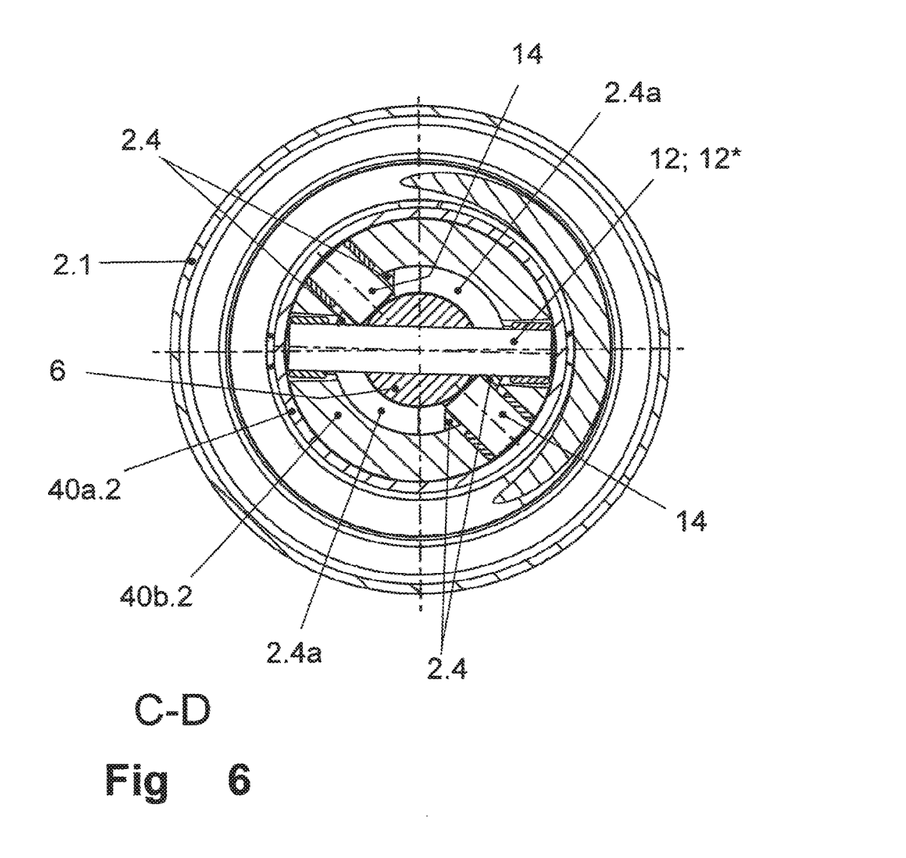

The structure of the two-piece or respectively two-part second drive piston 40 according to FIGS. 5, 6 (preferred second embodiment) is described below. Its arrangement and function within the actuating device 1 described above mainly corresponds with that of the first drive piston 4 in the FIGS. 1 to 4, and the above description is also transferable without restrictions to the second embodiment. A description to this effect is thus foregone.

The separation of the second drive piston 40 is provided in at least one casing surface of an outer piston 40*a* and of an inner piston 40*b* surrounding the axis of rotation A concentrically. In the exemplary embodiment, they are two radially spaced casing surfaces, so that a radially inward directed projection 40*a*.3 is formed on the outer piston 40*a* and a complementary return 40*b*.3 is formed on the inner piston 40*b*. The outer piston 40*a* and the inner piston 40*b* are preferably interconnected in a form-fitting and releasable manner. But the joining of the two can also be performed in a force- and/or positive-fit manner (for example pressing and/or welding, soldering). The inner piston 40*b* is designed in a bushing-like manner with a second piston floor 40*b*.1 and a casing-like second piston skirt 40*b*.2 connecting to it. The outer piston 40*a* has a piston ring 40*a*.1 and a piston casing 40*a*.2 connecting to it, and the piston casing 40*a*.2 surrounds the piston skirt 40*b*.2 preferably completely. The projection 40*a*.3 is located in the area of the second piston floor 40*b*.1 and it forms a form-fitting first pull connection with the return 40*b*.3 designed on the second piston floor 40*b*.1. The form fit between the outer and the inner piston 40*a*, 40*b* is completed by a locking ring 29 axially spaced from the first pull connection, and the sealing between the outer and inner pistons 40*a*, 40*b* causes a third seal 28 arranged between the projection and the return 40*a*.3, 40*b*.3. The supply of the pressurizing medium D into the pressurizing medium opening 18 takes place via a pressurizing medium connection part 30.

The at least one helical groove 4.3*a* and the at least one axial groove 4.4*a* are designed in the second piston skirt 40*b*.2. The piston casing 40*a*.2 functions as a protective casing for the second piston skirt 40*b*.2 and thus also forms a radial protection and shield for the drive bolts 12, 12* and their cam guide rollers 12*a* as well as the straight-line guide cams 14 and their straight-line guide rollers 14*a*.

In order to reduce the variety of parts during adjustment of the actuating device 1 for different large drive torques, outer pistons 40*a* are provided with piston rings 40*a*.1 designed with different outer diameters, which are respectively joined with inner pistons 40*b*, which always have one and the same size geometry.

A fastening bore hole 40*b*.4 designed for example as a threaded blind hole bore hole, which can serve many purposes, is designed in the front surface of the second piston floor 40*b*.1 facing the second housing front side 2.3. It can serve to receive a stroke limitation part, with which for example any stroke is pre-settable. It can also serve to connect with a piston of a so-called stack cylinder connecting to the actuating device 1, with which a corresponding increase in the axial drive force is generatable in the case of a predetermined pressure of the pressurizing medium D according to the overall piston surfaces provided from now on. Finally, it can also serve to connect with a confirmation device for capturing the respective position of the second drive piston 40. A fastening bore hole of the type described above can be also arranged for example in the first piston floor 4.1 of the first drive piston 4.

FIG. 5 shows a preferred radial and axial mounting of the drive shaft 6. For this purpose, the first bearing 16.1 and the second bearing 16.2 for the radial and additionally also for the axial mounting (axial bearing 22) of the drive shaft 6 are provided in the bearing casing 2.4 at a distance from each other. This mounting is also transferable to the first embodiment of the actuating device 1 with the first drive piston 4 designed as one part. The second bearing 16.2 neighboring the respective drive piston 4, 40 receives an axial force oriented towards it and the first bearing 16.1 receives an opposite axial force, respectively exerted preferably by a shoulder of the drive shaft 6 assigned to the respective bearing 16.2, 16.1. The drive shaft 6 is sealed in a pressurizing-medium-tight manner in the area of the first bearing 16.1 with respect to it by means of a first seal 26 and the first bearing 16.1 with respect to the bearing casing 2.4 by means of a second seal 27. This sealing is required when, instead of the return spring 8, the drive piston 4, 40 is transferred through reverse supply with a pressurizing medium D, i.e. through supply of the space between the drive piston 4, 40 and the first housing front side 2.2, to its idle or initial position. In the case of use of the return spring 8, the aforementioned space is ventilated through an undesignated bore hole in the housing casing 2.1.

REFERENCE LIST OF THE USED ABBREVIATIONS

1 Actuating device
2 Housing
2.1 Housing casing
2.2 First housing front side
2.3 Second housing front side
2.4 Bearing casing
2.4*a* Stop means (e.g. circumferential groove)
4 First drive piston
4.1 First piston floor
4.2 First piston skirt
40 Second drive piston
40*a* Outer piston
40*a*.1 Piston ring
40*a*.2 Piston casing
40*a*.3 Projection
40*b* Inner piston
40*b*.1 Second piston floor
40*b*.2 Second piston skirt
40*b*.3 Return
40*b*.4 Fastening bore hole
4.3 Cam guide
4.3*a* Helical groove
4.4 Straight-line guide
4.4*a* Axial groove
6 Drive shaft
6.1 Drive recess
6.2 Cross hole
6.3 Front-side recess
8 Return spring
(8) Return spring (within the piston skirt 4.2, 40*b*.2)
10 Piston seal
12 Drive bolt
12* Continuous drive bolt
12*a* Cam guide roller
14 Straight-line guide cam
14*a* Straight-line roller
16.1 First bearing
16.2 Second bearing
18 Pressurizing medium opening
20 Casing tube
22 Axial bearing
23 Lantern housing
23*a* Lantern flange
24 Threaded bolt
25 Nut
26 First seal
27 Second seal 28 Third seal
29 Locking ring
30 Pressurizing medium connection part
A Axis of rotation
D Pressurizing medium (pneumatic, hydraulic)
E Arrangement plane
+h Positive stroke orientation
−h Negative stroke orientation
n Rotary movement The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

The invention claimed is:

1. An actuating device (1) for a rotatable closure part of a valve, comprising
    a housing (2), in which a drive piston (4; 40) that is sealed from a cylindrical housing casing (2.1) and is suppliable on one side with a pressurizing medium (D) is arranged, which has a piston skirt (4.2; 40b.2), with a drive shaft (6), which is guided on one side out of the housing (2) and drives in a rotating manner the closure part indirectly or directly, wherein the drive piston (4; 40) executes either an axial shift movement against the effect of at least one return spring (8) in the case of a one-sided supply with the pressurizing medium (D) or a back and forth shift movement in the case of an alternating supply with a pressurizing medium, wherein the piston skirt (4.2; 40b.2) experiences an axially oriented guidance in the housing (2) via at least one axial groove (4.4a) formed in it, into which a straight-line guide cam (14) permanently connected with the housing (2) engages, and wherein the piston skirt (4.2; 40b.2) has at least one helical groove (4.3a) arranged in it, into which a drive bolt (12; 12*) permanently arranged on the drive shaft (6) engages, so that the radially and axially mounted drive shaft (6) experiences a rotation around the axis of rotation (A) due to the axial shift movement of the drive piston (4; 40) oriented in the direction of its axis of rotation (A),
    wherein the drive shaft (6) is radially mounted on two sides in a bearing casing (2.4) engaging in the housing, permanently connected with it and ending in it,
    the piston skirt (4.2; 40b.2) is mounted in an axially displaceable and radial manner on an outer casing surface of the bearing casing (2.4),
    and in that the at least one drive bolt (12) experiences a stroke-independent, direct limitation of its rotary movement around the axis of rotation (A) due to stop means (2.4a) provided in the bearing casing (2.4).

2. The actuating device according to claim 1, wherein the drive piston (40) is designed in at least two pieces and its separation is provided in at least one casing surface of an at least one outer piston (40a) and of an at least one inner piston (40b) concentrically surrounding the axis of rotation (A).

3. The actuating device according to claim 2,
    wherein the at least one outer piston (40a) and the at least one inner piston (40b) are interconnected in a form-fitting and releasable manner.

4. The actuating device according to claim 2,
    wherein a second piston floor (40b.1) and a second piston skirt (40b.2) connecting to it, in that the outer piston (40a) has a piston ring (40a.1) and a piston casing (40a.2) connecting to it, and in that the piston casing (40a.2) completely surrounds the piston skirt (40b.2).

5. The actuating device according to claim 4,
    wherein the at least one helical groove (4.3a) and the at least one axial groove (4.4a) are designed in the second piston skirt (40b.2).

6. The actuating device according to claim 2,
    wherein the at least one outer piston (40a) forms a first pull connection due to a projection (40a.3) extending radially inward in the area of a second piston floor (40b.1) with a return (40b.3) designed on the second piston floor (40b.1).

7. The actuating device according to one of claim 2,
    wherein the at least one outer piston (40a) with piston rings (40a.1) designed with differently sized outer diameters are joined with at least one inner piston (40b) that always have one and the same size geometry.

8. The actuating device according to claim 1,
    wherein the at least one straight-line guide cam (14) is fastened in or on the bearing casing (2.4).

9. The actuating device according to claim 1,
    wherein two straight-line guide cams (14) arranged diametrically to each other are provided, each of which engages in an assigned axial groove (4.4a).

10. The actuating device according to claim 1,
    wherein two helical grooves (4.3a) arranged diametrically to each other in the piston skirt (4.2; 40b.2) are provided, into which respectively an assigned drive bolt (12) engages.

11. The actuating device according to claim 10,
    wherein two drive bolts (12) are combined into a single, continuous drive bolt (12*), which engages in one of the helical grooves (4.3a) with its respective end.

12. The actuating device according to claim 11,
    wherein the stop means (2.4a) assigned to the drive bolt (12*) is designed in the form of two circumferential grooves (2.4a) arranged diametrically to each other, provided in the bearing casing (2.4), extending in a limited manner in its circumferential direction, on the respective end-side boundary of which respectively one end of the drive bolt (12*) comes to rest.

13. The actuating device according to claim 1,
    wherein the straight-line guide cam (14) and the drive bolt (12; 12*) are arranged with their respective longitudinal axis in a single arrangement plane (E) oriented perpendicular to the axis of rotation (A).

14. The actuating device according to claim 13,
    wherein the arrangement plane (E) runs through an end-side area of the bearing casing (2.4) facing the drive piston (4; 40).

15. The actuating device according to claim 1,
    wherein the stop means (2.4a) assigned to the drive bolt (12) is designed in the form of a circumferential groove (2.4a) provided in the bearing casing (2.4) and extending in a limited manner in its circumferential direction, on the respective end-side boundary of which the drive bolt (12) comes to rest.

16. The actuating device according to claim 15,
wherein the respective circumferential groove (2.4a) is to be measured in the circumferential direction such that the circumferential groove (2.4a) in consideration of and in cooperation with the relevant dimensions of the assigned drive bolt (12, 12*) between the limited rotary movement end positions of the drive bolts (12, 12*) permits an angle of rotation that corresponds exactly with a target value.

17. The actuating device according to claim 1,
wherein the respective axial groove (4.4a) and/or the respective helical groove (4.3a) are designed open towards the free end of the piston skirt (4.2; 40b.2).

18. The actuating device according to claim 1,
wherein a first bearing (16.1) and a second bearing (16.2) are provided for the radial and axial mounting of the drive shaft (6) in the bearing casing (2.4) at distance from each other, wherein the second bearing (16.2) neighboring the drive piston (4; 40) receives an axial force oriented towards it and the first bearing (16.1) receives an opposite axial force, respectively exerted by the drive shaft (6).

19. The actuating device according to claim 1,
wherein at least one return spring (8) is arranged within the first piston skirt (4.2) and is axially supported on a first piston floor (4.1) of the first drive piston (4) and in that the receiver and axial support of the at least one return spring (8) is provided in a front-side recess (6.3) in the drive shaft (6).

20. The actuating device according to claim 19,
Wherein the return spring (8) is designed divided in two in the longitudinal direction and its neighboring ends are received in an intermediate piece, which is guided in an axially displaceable manner in the front-side recess (6.3).

21. The actuating device according to claim 1,
wherein the actuating device (1) functions as a pneumatically or hydraulically actuatable rotary drive for a disk or throttle valve.

* * * * *